Figure 1:
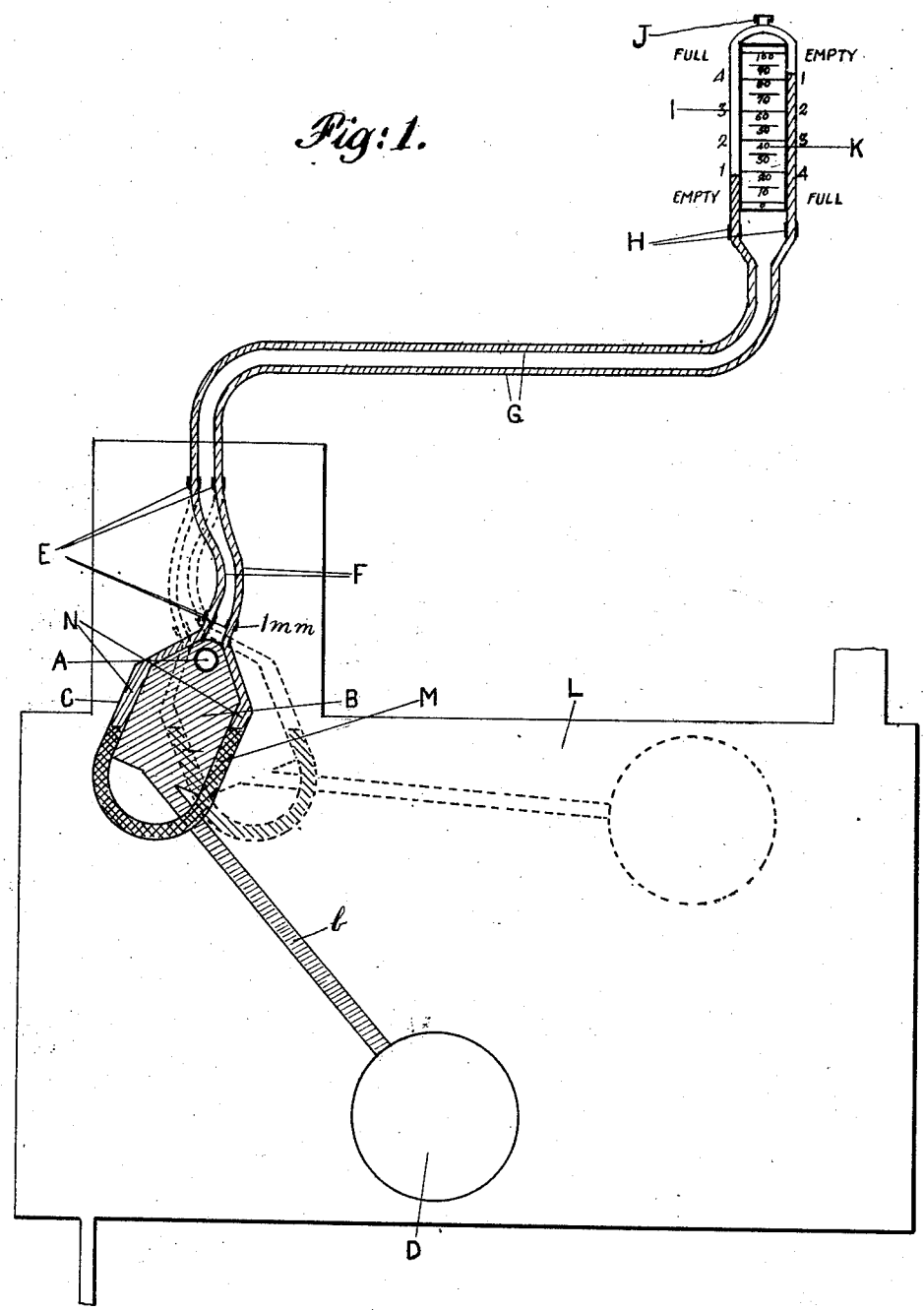

Oct. 7, 1930.     H. O. MORGAN     1,777,415
GAUGE
Filed Dec. 3, 1924     2 Sheets-Sheet 1

INVENTOR.
Hans O. Morgan
BY
Edward Jager & Power
ATTORNEYS.

Oct. 7, 1930.                H. O. MORGAN                1,777,415
                                GAUGE
                          Filed Dec. 3, 1924        2 Sheets-Sheet 2
Fig:2.  Fig:3.  Fig:4.
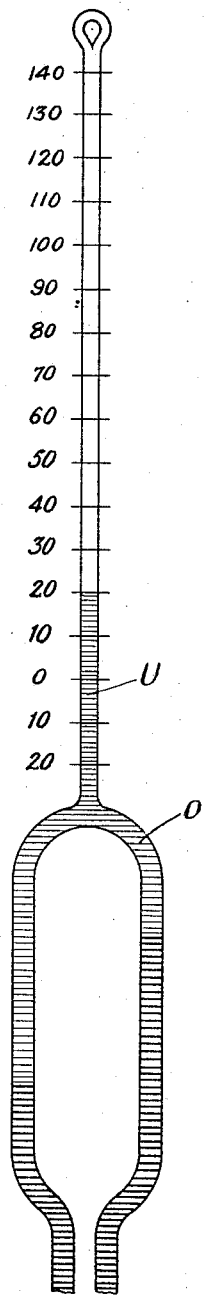
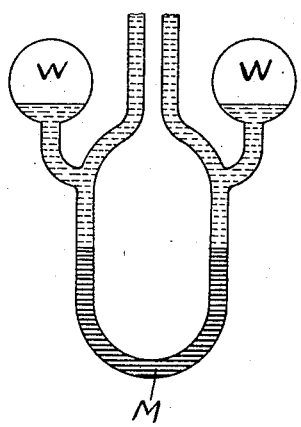
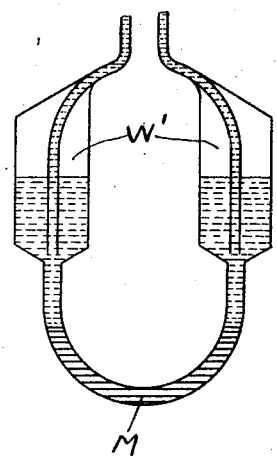
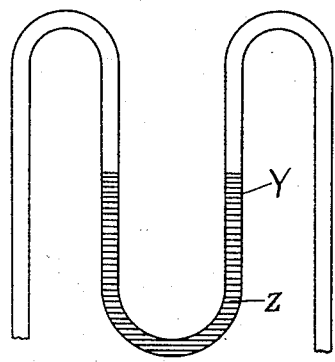
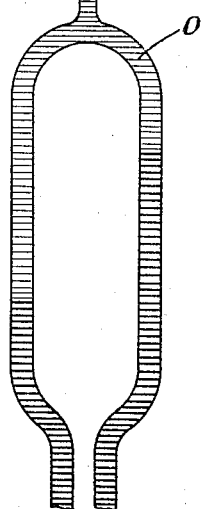
Fig:5.
Fig:6.
INVENTOR
Hans O. Morgan
BY
Edwards, Soyer & Ruver
ATTORNEYS

UNITED STATES PATENT OFFICE

HANS OTTO MORGAN, OF WEST ENGLEWOOD, NEW JERSEY

GAUGE

Application filed December 3, 1924. Serial No. 753,541.

This invention relates to measuring means to measure the displacement or temperature or both of an element such, for instance, as a liquid in a tank.

The object of the invention is to provide a gauge which will accurately show the displacement irrespective of temperature variation and at a distance from the displacement being measured. A further object of the invention is to provide a gauge which will give either displacement or temperature readings or both.

Other objects of the invention particularly in the provision of the gauge of simple, durable form will appear from the following description taken in connection with the accompanying drawings in which Fig. 1 is a diagrammatic illustration of a gauge connected to indicate the liquid level of a tank, Fig. 2 is a diagram showing a modification, Figs. 3, 4 and 5 are diagrams illustrating further modifications, and Fig. 6 is a diagrammatic view of another embodiment of the invention.

In the accompanying Fig. 1 illustrating the invention a liquid in a tank L raises and lowers a spherical float member D connected by rod $b$ to a movable support B mounted on the pivot A so as to freely turn thereon around the axis of said pivot as indicated in full and dotted lines in the drawing. C is a U-tube of glass, metal or other desired material rigidly fastened in place on the pivotal support B so as to turn therewith. The lower portion of the U-tube C below the pivot A carries a heavy liquid M such as mercury filling the bend of the U-tube and extending up into the branches on each side.

As the support B and U-tube C are tipped to different positions as indicated, the level of the mercury M tends to remain constant so that the mercury moves from one branch to the other or vice versa depending upon the direction of movement of the support. This relative movement of the mercury in the U-tube is a substantially accurate measure of the tipping movement of the support B. To indicate this mercury movement at a distant point the ends of the U-tube C are connected to tubes F, G, and the upper portion of the U-tube and these tubes F, G are filled with water or other relatively light liquid as indicated at N. The upper levels of these light liquid columns N will register the movement of the mercury M in the U-tube C.

These upper levels of the light liquid columns are contained within the vertical branches of the inverted glass U-tube I, the bore of these branches being identical and relatively small to give a large variation in the column levels for a small movement of the mercury in the U-tube C, the specific gravity of the lighter liquid being much less than the specific gravity of the mercury. The upper portion of the U-tube above the light liquid N levels is preferably exhausted and sealed by a tight fitting cap J for instance to prevent the liquid N from evaporating or the outside air from entering. The two light liquid columns will at all times exert nearly equal pressures above the mercury columns in the branches of the U-tube C, the only difference being the slightly higher pressure due to the relatively small differences in the lengths of these light liquid columns, for instance, with tubes G of any desired length, the difference in pressure of the light liquid columns at the mercury will correspond to only about a one inch water column and this will of course cause a slight difference in the level of the mercury in the opposite branches of the U-tube C, mercury being over thirteen times as heavy as water.

With the apparatus diagramed in the drawing the full line position shows the left column of the U-tube I indicating nearly empty and the right column indicating the same. As the liquid level of the tank L rises the U-tube C will tip counter-clockwise and raise the left level while lowering the right level until the two levels are substantially the same at approximately the vertical position of the U-tube C, then further tipping of the U-tube C to the dotted line position will raise the left level to nearly the full position and lower the right level to the same indication. Scales may be provided with any desired designations reading upward for the left branch and downward for the right branch. The approximate condition of the level in the tank may be read from either branch alone but the precisely accurate position of the level will be determined at all temperatures and under all conditions by averaging the reading of both branches so as to neutralize any temperature variation.

The levels in the branches of the U-tube I will also give temperature readings to a very close accuracy. For this purpose a central scale marked "temp" and designated K may be provided to calibrate for the desired range of temperatures and with the U-tube C in substantially vertical position and the levels in the branches of U-tube I the same, then the temperature may be read irrespective of the variation of the position of the U-tube C by simply averaging the temperature readings of the two levels in the branches of the U-tube I. For instance, the temperature indicated by the present showing would be about 50 which is attained by adding the 18 indication of the left level to the 82 indication at the right level and dividing the same by 2.

The precise accuracy of the temperature indication will depend upon the temperature variation throughout the entire apparatus being the same as is usually the case. Where, however, the tubes G are at a different temperature from the U-tube C the result in variations in the temperature readings may be minimized by making the volume of the liquid in the tubes very small in comparison to the volume of the mercury M. The tubes F and G may be all about $\frac{1}{16}''$ bore as compared with a much larger bore for the mercury of U-tube C which may be of any desired diameter. The tubes G are shown as connected to the U-tube I at H and at this point the bore of the U-tube branches is extremely small, being only about 1 millimeter in diameter and there is a similar small bore at the ends of the U-tube C where the flexible tubes F are connected to said U-tube as indicated at E.

In the specific embodiment of the invention diagram in Fig. 1 the center of gravity of the parts pivotally moving around the center A is below said center and there will therefore be a variable portion of the weight of these parts carried by the float D and a resultant variable submergence of the float in the liquid. The relation of an increment of movement of the float D to the movement of the liquid level also changes as the float moves from empty to full position. These variations are however of constant characteristics of the apparatus shown and will be taken care of in the calibration of the scales of the branches of the U-tube I so that very accurate readings of the liquid level will be attained as above set forth.

Instead of the float arrangement b, D shown, any other desired means may be used to tip the U-tube C by the movement of the liquid level.

The inverted U-glass 1 may be replaced by one such as shown in Fig. 2 in which the upper levels of the light liquid such as water, may be connected by a lighter liquid, such as oil, O, and then a single column U of the oil will give accurate temperature readings without averaging or other calculations. The thermometer is thus independent of any change in the levels of the columns.

Where very precise temperature readings are desired or the effect of the columns of light liquid is great with relation to the temperature variations the temperature of the contents of the tank may be recorded by equal sized bulbs W filled with air or other gas as shown in Fig. 3, added to the U-tube structure so as to make the instrument act as an air thermometer. If the instrument be now filled with a liquid having small thermal coefficient of expansion a very accurate thermometer will result. It is evident that the air bulbs W may be of any desired shape or incorporated in the U-tube as indicated at W' in Fig. 4.

By substituting a gas for the columns of light fluid between the heavy liquid in the U-tube and the measuring levels and by connecting both of the gas columns to the branches of a U-tube Y as shown in Fig. 5, the levels of a liquid Z in the U-tube will indicate the degree of tipping of the lower U-tube without regard to temperature variations since such variations are equal for both columns.

As indicated in Fig. 6 the gauge of this invention may be used to indicate displacement of any member such for instance as a rod R moved by pressure from the right against the diaphragm P. Here the diaphragm P and adjustable spring S convert pressure variations into proportionate displacements of the rod R connected to tip the support B' and thus move the mercury M' in the U-tube C' connected as indicated at F' to liquid column tubes such as G shown in Fig. 1. In Fig. 6 the support B' and tube C' are also arranged and so counterbalanced that their center of gravity is substantially coincident with the pivotal point A' so as to offer no substantial resistance to turning. In this apparatus the pressure variations on the diaphragm P will be indicated with precise accuracy by the variation in the light fluid levels of the U-tube I and temperature readings may also be made as set forth above in connection with Fig. 1.

While water is above mentioned as the liquid used in the light liquid columns any other desired relatively light liquid may be used such for instance as a mixture of alcohol and water or where temperature conditions demand it any desired liquid having a freezing point below that of water or a boiling point above that of water may be employed. The dimensions of the parts in the drawings are illustrative merely and will, of course, be varied to suit particular installations; the bores of the tubes for the columns of light liquid may be especially small to transmit pressures without involving a large volume of the light fluid.

I claim:

1. A displacement gauge comprising a container formed to hold directly connected columns of a relatively heavy liquid, a liquid actuated device moving the container for varying the relative lengths of said columns by the displacement to be measured, and means containing a pair of columns of relatively light liquid for indicating the variations in the length of the heavy liquid columns, the heavy liquid and light liquid colums being combined in a pair of continuous columns having their upwardly facing ends adapted to indicate both displacement and temperature of the heavy liquid columns.

2. A displacement gauge comprising a container formed to hold directly connected columns of a relatively heavy liquid, a liquid atcuated device for moving said container to vary the relative lengths of said columns according to the displacement being measured, tubing containing columns of relatively light liquid connected to said heavy liquid columns with each light liquid column directly contacting with its corresponding heavy liquid column, a third body of still lighter liquid having two separate lower branches resting respectively on the upwardly facing surfaces of said light liquid columns and having a single upper branch for indicating temperature by the level of its upwardly facing surface.

HANS OTTO MORGAN.